US012756646B1

(12) United States Patent
Xiang et al.

(10) Patent No.: US 12,756,646 B1
(45) Date of Patent: Oct. 6, 2026

(54) PRECISION TIME PROTOCOL CLOCK SYNCHRONIZATION IN A HIGH AVAILABILITY NETWORK

(71) Applicant: Calix, Inc., San Jose, CA (US)

(72) Inventors: Youbin Xiang, Nanjing (CN); Xi Kang, Nanjing (CN); Weining Zhou, Nanjing (CN)

(73) Assignee: Calix, Inc, San Jose, CA (US)

(*) Notice: Subject to any disclaimer, the term of this patent is extended or adjusted under 35 U.S.C. 154(b) by 46 days.

(21) Appl. No.: 19/006,817

(22) Filed: Dec. 31, 2024

(51) Int. Cl.

| | |
|---|---|
| ***H04L 43/0852*** | (2022.01) |
| ***H04W 24/10*** | (2009.01) |
| ***H04W 40/34*** | (2009.01) |
| ***H04W 56/00*** | (2009.01) |

(52) U.S. Cl.
CPC ......... *H04L 43/0852* (2013.01); *H04W 24/10* (2013.01); *H04W 40/34* (2013.01); *H04W 56/001* (2013.01)

(58) Field of Classification Search
CPC .. H04L 43/0852; H04W 24/10; H04W 40/34; H04W 56/001
See application file for complete search history.

(56) References Cited

U.S. PATENT DOCUMENTS

| | | | | |
|---|---|---|---|---|
| 8,954,609 | B1 * | 2/2015 | Holleman | H04J 3/0667 709/227 |
| 11,503,557 | B2 * | 11/2022 | Aijaz | H04W 56/007 |
| 2024/0031925 | A1 * | 1/2024 | Tiwari | H04W 48/18 |
| 2025/0141576 | A1 * | 5/2025 | Nandy | H04J 3/0667 |

FOREIGN PATENT DOCUMENTS

| | | | | |
|---|---|---|---|---|
| WO | WO-2019201438 | A1 * | 10/2019 | H04W 56/005 |

* cited by examiner

*Primary Examiner* — Benjamin M Thieu
(74) *Attorney, Agent, or Firm* — Patterson + Sheridan, LLP

(57) ABSTRACT

The disclosure provides an approach for precision time protocol (PTP) clock synchronization. Embodiments include transmitting, by a time transmitter node to a time receiver node, a synchronization message via one or more intermediate nodes. The one or more intermediate nodes may record path information associated with routing the synchronization message. Embodiments include receiving, by the time transmitter node, a delay request message from the time receiver node via the one or more intermediate nodes. The delay request message may be routed to the time transmitter node based on the path information. Embodiments include transmitting, by the time transmitter node to the time receiver node, a delay response message via the one or more intermediate nodes.

20 Claims, 6 Drawing Sheets

PRECISION TIME PROTOCOL CLOCK SYNCHRONIZATION IN A HIGH AVAILABILITY NETWORK

BACKGROUND

Optical networks are used to deliver voice, data and/or video services to multiple network subscribers using one or more optical fibers. The optical networks deployed to deliver the voice, data and video services may be either passive or active. In a passive optical network (PON), for example, passive optical splitters and combiners enable multiple subscribers to share the same optical fiber. Thus, the PON functions as a point-to-multipoint optical network. A PON may conform to any of a variety of PON standards, such as broadband PON (BPON) (ITU G.983), gigabit-capable PON (GPON) (ITU G.984), or gigabit-capable Ethernet PON (GEPON or EPON) (IEEE 802.3). In an active optical network, some sort of electrically powered equipment, such as a switch, router, or multiplexer, distributes the signal to the subscriber to which the signal is destined. Thus, an active optical network, such as an active Ethernet (AE) optical network (IEEE 802.3ah), may operate as a point-to-point network.

As one example, when optical fiber extends to a premise where one or more subscriber devices are located, the service is commonly referred to as Fiber to the Premises (FTTP) or Fiber to the Home (FTTH). In FTTP/FTTH services, an optical network unit (ONU) terminates an optical fiber of the optical network, and delivers the signals on the optical fiber to subscriber devices to provide FTTP services. Subscriber devices may include, for example, televisions, set-top boxes, telephones, computers, or other network client devices. The ONU also receives signals from subscriber devices, and transmits the signals upstream via the optical network. In this manner, the ONU can support a wide variety of services, including voice, video and data services, over the optical network.

Packet-based time synchronization protocols, such as precision time protocol (PTP), fundamentally depend on distribution of a synchronization message from a time transmitter component (e.g., a main or "master" clock) to time receivers (e.g., subsidiary clocks or clients) to announce the current time with configurable frequency. These synchronization messages are subject to packet processing delay and delay variations as they are switched from the time transmitter to the time receivers through a packet network. To increase the accuracy of the network clock, the time receivers can optionally try to measure the network packet delay and compensate for the time it takes for the synchronization message to travel through the network. Furthermore, network operators can implement an out-of-band time distribution network or utilize packet prioritization techniques to decrease the packet delay and delay variation for these protocol packets.

IEEE 1588 (which describes PTP) and network time protocol (NTP) time distribution protocols both include this fundamental concept to support synchronization to a network clock. These protocols utilize network delay measurement to increase the accuracy of the clock by using a delay measurement message that gets initiated by the time receiver and responded to by the time transmitter. The time receiver, by using a timestamp, is able to measure a round trip delay and approximate the one-way delay that the network introduces by dividing the round trip delay by two to arrive at a one-way delay measurement. It is inherently assumed that the network has symmetrical characteristics and the delay variation is not significant in these examples.

However, in some cases there may be multiple paths through a network between a time transmitter and a time receiver. For example, a synchronization packet may be routed between a time transmitter and a time receiver through a first group of network elements, while a delay request packet may be routed between the time receiver and the time transmitter through a different group of network elements. Further, a delay response packet may be routed between the time transmitter and the time receiver through yet a different group of network elements. The opportunities for such asymmetries in routing increase in particular types of networks, such as high availability networks, where additional network elements and paths may be present in the network. These types of asymmetry (e.g., packets traveling via different routes in forward and reverse directions) can potentially compromise the precision of clock synchronization.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
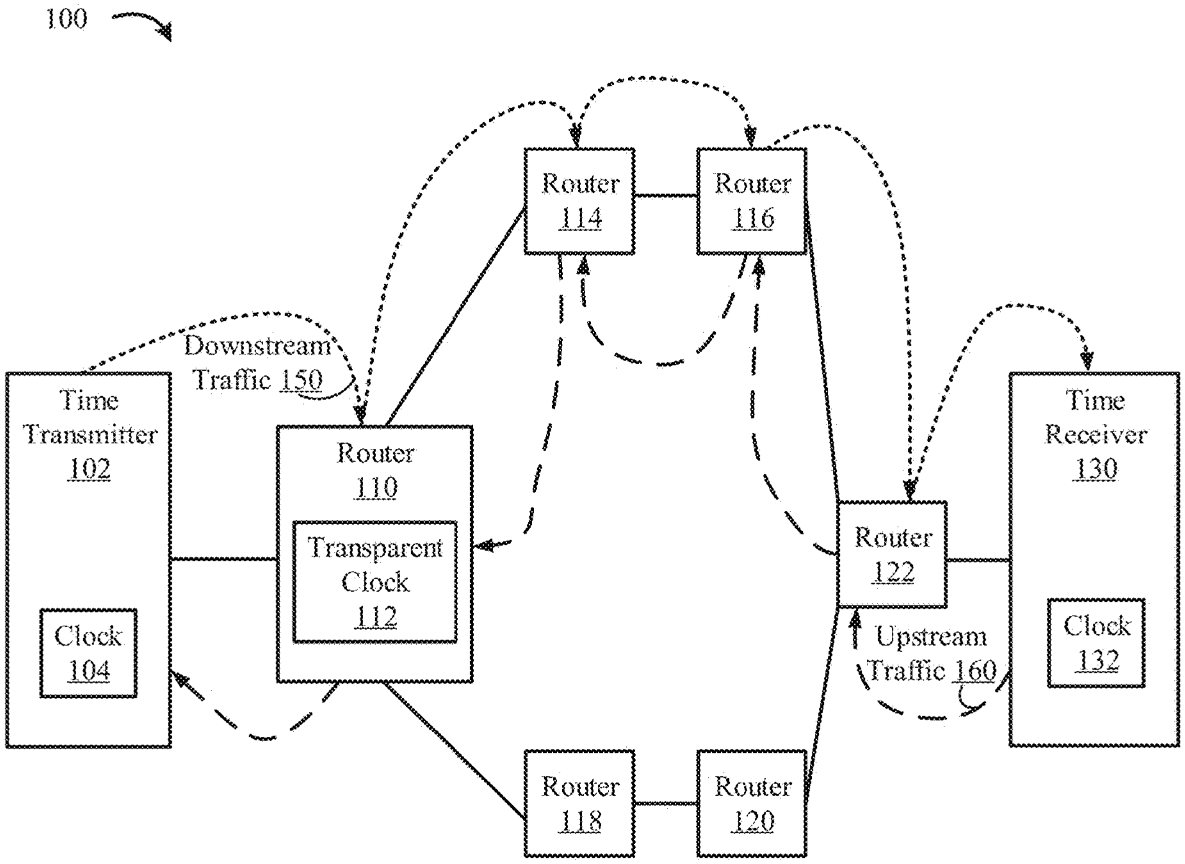
FIG. 1 is an illustration of an example networking environment in which operations related to precision time protocol clock synchronization may be performed, according to certain embodiments.

The present disclosure relates to precision time protocol (PTP) clock synchronization. An example of a networking environment in which techniques described herein may be performed is described below with respect to FIG. 1.

For example, the present disclosure provides approaches for guaranteeing forward and reverse PTP packets are transferred via the same path in a network as well as techniques for ensuring high availability of time distribution when PTP packets are transferred between different processing units inside a network node. As described in more detail below with respect to FIG. 1, downstream PTP packets sent from a time transmitter to a time receiver may potentially be transferred via a different path than upstream PTP packets transmitted from the time receiver to the time transmitter. Existing techniques for ensuing symmetry between downstream and upstream PTP packet paths are limited to particular contexts, such requiring static configuration at two bridged systems to enforce bidirectional transmission of PTP packets over a single link between the two bridged systems. However, such techniques require two bridged systems that have matching configurations and often result in slower response time during link switchover due to link failure (thereby degrading performance). Another existing technique involves transferring PTP packets over a multi-protocol label switching (MPLS) network in a multi-node network with routing technology. In such techniques, the timing label switched path (LSP) that runs between ingress and egress must be co-routed, and this may be accomplished through configuration or signaling. However, such techniques are limited to MPLS networks, and cannot be employed in other types of networks such as layer-3 (L3) networks running various routing protocols. Furthermore, when the timing LSP path fails, a protection switch usually causes a change in delay, which may be undetected by a time receiver and can reduce accuracy of the time receiver's clock. Additionally, existing PTP techniques involve a single PTP timing subsystem in each node, and if a node failure occurs in such a system, timing service cannot be provided to clients of the failed node.

Certain techniques described herein address the technical challenges discussed above through path recording (either in packets or in forwarding databases) and redundant timing subsystems in high availability nodes. As described in more detail below with respect to FIG. 2, network elements located along a path by which a downstream packet is routed from a time transmitter to a time receiver may record path information (e.g., network element identifiers, ingress interfaces by which the packet was received, and/or the like) in the packet. The path information in the downstream packet may then be copied by the time receiver into an upstream packet and used to route the upstream packet from the time receiver to the time transmitter via the same path. Similarly, the time transmitter may then copy the path information into a subsequent downstream packet and the path information may be used to ensure consistent routing of the subsequent downstream packet from the time transmitter to the time receiver via the same path.

Furthermore, as described in more detail below with respect to FIG. 3, a time receiver may select between different paths by which different downstream packets (e.g., synchronization packets) are routed from a time transmitter to the time receiver using dynamic path selection logic. For example, such path selection logic may be based on a number of hops, a delay variation, a synchronization message interval, an amount of delay, and/or the like. Thus, the time receiver may select an optimal path by which PTP packets are to be transmitted between the time receiver and the time transmitter, and the recorded path information for the selected path may be used to ensure that subsequent PTP packets are routed accordingly.

Additionally, as described in more detail below with respect to FIG. 4, some embodiments may involve recording path information related to routing PTP packets (e.g., from a time transmitter and directed to a time receiver) in a forwarding database at each network element along the path, and using the path information in the forwarding database to ensure that subsequent PTP packets between the time receiver and the time transmitter are routed along the same path. The path information recorded in a forwarding database at a given network element may include, for example, a media access control (MAC) address, a virtual local area network (VLAN), a link aggregation group (LAG) interface, and/or the like associated with a source and/or destination of a given PTP packet. While conventional techniques for selecting a LAG link by which to transmit a PTP packet generally involve a hash mode selection by each network element, these techniques often result in different paths being used for bidirectional packets (e.g., packets sent from node A to node B may be sent via a first LAG link between those two nodes while packets sent from node B to node A may be sent via a second, different LAG link between those two nodes), causing asymmetry and resulting in performance degradation for PTP timing. However, by utilizing forwarding databases at network elements to store path information (including LAG link information) associated with PTP packets, techniques described herein allow bidirectional PTP packets to be routed in a symmetrical manner, ensuring consistent performance for PTP timing.

Furthermore, as described in more detail below with respect to FIG. 5, some embodiments may involve a high availability node that includes two network interface cards in different slots, each of which has its own timing subsystem that runs its boundary clock function independently. As a PTP server, the timing subsystem on each of the two cards may interact with PTP clients connected to both the local and mate card. The timing subsystem on each of the two cards can communicate with the timing subsystem on the other card, and these timing subsystems may decide a best primary timing subsystem to provide timing to downlink nodes. The other timing subsystem may enter secondary state, and may not advertise announce messages. In case of one card failure, the node may switch over to the other card and still distribute timing to subordinate PTP clients.

Thus, by ensuring consistent routing of PTP packets along a symmetrical path in both directions between a time transmitter and time receiver through path recording (either within the packet or in forwarding databases), including recording of LAG link information in some embodiments, techniques described herein improve the performance and accuracy of PTP packet exchanges, such as producing reliably accurate delay determinations by a time receiver in a manner that was not possible with prior techniques. Furthermore, aspects of the present disclosure provide a high availability solution for nodes that distribute timing information to clients, such as including two cards with independent timing subsystems (e.g., one primary and one secondary) that communicate with one another (e.g., via an external link) to coordinate roles and handling of PTP packets within a high availability node. Thus, techniques described herein allow timing information to be distributed to clients in a consistent manner even in the event of a timing subsystem failure.

Compared to prior techniques, aspects of the present disclosure provide a universal solution for any type of transport of PTP messages, without any specific requirements for underlying protocols. Furthermore, unlike existing techniques, aspects of the present disclosure do not require specialized hardware dependency. Additionally, techniques described herein are self-adaptive on link/path failure, and provide faster link/path switching than existing techniques.

FIG. 1 is an illustration 100 of an example networking environment in which operations related to precision time protocol (PTP) clock synchronization may be performed, according to certain embodiments.

In illustration 100, a time transmitter 102 and a time receiver 130 are configured to exchange PTP packets related to clock synchronization over a packet network that includes multiple routers 110, 114, 116, 118, 120, and 122. Time transmitter 102 and time receiver 130 may, for example, represent network devices that include clocks 104 and 132. Time transmitter 102 generally comprises a primary clock that provides timing information to time receiver 130. Routers 110 114, 116, 118, 120, and 122 generally represent network devices (e.g., network routers) that receive PTP packets and forward such packets to next network hops. Each router may comprise a transparent clock. For example, router 110 comprises a transparent clock 112, which is configured to measure the time it takes for a PTP packet to pass through it and adjusts the packet accordingly, making the transparent clock "transparent" to the timing signal by compensating for its internal delay, rather than acting as a time transmitter or time receiver itself. Transparent clock 112 generally forwards the time information with necessary corrections to maintain accurate synchronization across a network.

Traffic between time transmitter 102 and time receiver 130 may be routed via a variety of different paths, such as including different combinations of routers 110, 114, 116, 118, 120, and/or 122. Techniques described herein may be utilized to ensure symmetrical routing of bidirectional PTP traffic between time transmitter 102 and time receiver 130. For example, path recording techniques described below may be used to ensure that downstream traffic 150 from time transmitter 102 to time receiver 130 is routed via the same path as upstream traffic 160 from time receiver 130 to time transmitter 102. For example, if a synchronization packet is routed from time transmitter 102 to time receiver 130 via routers 110, 114, 116, and 122, techniques described herein ensure that a delay request packet is routed from time receiver 130 to time transmitter 102 via the same path (in reverse) through routers 122, 116, 114, and 110. Furthermore, techniques described herein may ensure that a delay response packet sent from time transmitter 102 to time receiver 130 in response to the delay request message is also routed via the same path through routers 110, 114, 116, and 122. For instance, without techniques described herein, upstream traffic 160 could have been routed via a different path than downstream traffic 150 (e.g., downstream traffic 150 could be routed via routers 110, 114, 116, and 122 while upstream traffic 160 could have been routed via routers 122, 120, 118, and 110), leading to asymmetry and poor PTP timing performance. Aspects of the present disclosure prevent such issues through recording of path information either within packets or in forwarding databases, and using such recorded path information to ensure symmetrical routing of bidirectional PTP traffic.

Figure 2:
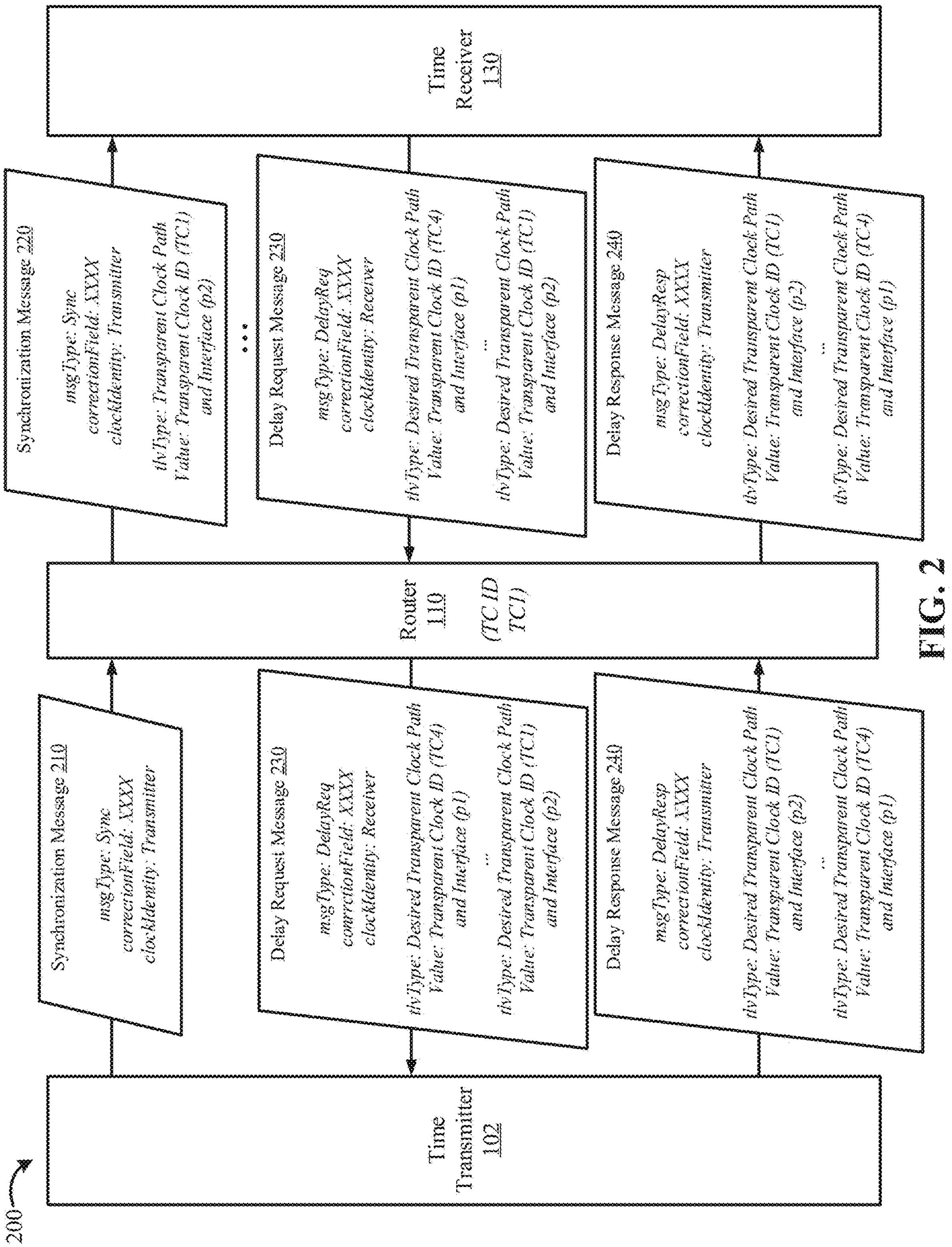
FIG. 2 is an illustration of an example related to precision time protocol clock synchronization, according to certain embodiments.

FIG. 2 is an illustration 200 of an example related to precision time protocol clock synchronization, according to certain embodiments. Illustration 200 includes time transmitter 102, router 110, and time receiver 130 of FIG. 1.

A synchronization message 210 may be sent from time transmitter 102 and directed towards time receiver 130, and may be routed via a set of network elements including router 110. Synchronization message 210 may include, for example, a message type field indicating that it is a synchronization type message, a correction field to record the accumulated residence time measured by transparent clocks along the transmission path, and a clock identity field indicating a unique identifier of the PTP clock from which synchronization message 210 has been transmitted (in this case, indicating an identifier of the time transmitter).

Router 110 (which, in the illustrated example, has a transparent clock identifier of TC1) may, after receiving synchronization message 210, record path information in synchronization message, producing synchronization message 220, For example, the recorded path information may include an identifier of router 110 (e.g., transparent clock identifier TC1) and an indication of an ingress interface by which router 110 received synchronization message 210 (e.g., interface P2). For instance, the path information may be recorded in the synchronization message in the form of a type-length value (TLV) data structure being added to the packet (message). A TLV type for the path information may be, for example "transparent clock path" and a TLV value for the path information may be, for example, a transparent clock identifier (TC1) and an interface identifier (p2). Thus, synchronization message 220 may include the path information recorded by router 110, and may be received by a next hop along the path. For example, while not shown, routers 114, 116, and 122 may also be hops in the path, and may process the synchronization message in a similar manner to that described with respect to router 110 (e.g., each of these routers recording its transparent clock identifier and an identifier of the ingress interface by which it received the synchronization message as a new TLV data structure within the synchronization message and then forwarding the modified synchronization message to a next hop) until the synchronization message reaches time receiver 130 with the path information from each router in the path having been added.

Time receiver 130 may use the path information from the synchronization message that it receives to specify a desired path for a delay request message. In some cases, time receiver 130 may select among multiple paths that are indicated in multiple synchronization messages that it receives from time transmitter 102 to determine a desired path for the delay request message, such as using path selection techniques described below with respect to FIG. 3. Once a path has been selected, time receiver 130 may add the desired path information to delay request message 230 (e.g., as one or more TLV data structures) and send delay request message 230 towards time transmitter 102 (e.g., sending delay request message 230 to the first hop in the desired path). It is noted that the synchronization message 210 initiated by time transmitter 102 and the delay request message 230 initiated by time receiver 130 are independent of one another. For example, the time receiver may transmit delay request messages at a configured delay request interval on its own, and the delay request interval can differ from a synchronization message interval at which time transmitter 102 transmits synchronization messages.

Time receiver 130 may add the desired path information to delay request message 230 in a reverse order from the order in which the path information appeared in the synchronization message from which the path information was determined. For example, the last hop in the path information in the synchronization message may become the first hop in the path information that is added to the delay request message. In the depicted example, time receiver 130 adds a series of TLV data structures to delay request message 230, beginning with a TLV data structure indicating a TLV type of "desired transparent clock path" and a TLV value of transparent clock ID TC4 and interface P1 (e.g., indicating that the first hop in the path should be the router corresponding to the transparent clock identifier TC4, such as router 122, and that the packet should be transmitted from that router via interface P1) and ending with a TLV data structure indicating a TLV type of "desired transparent clock path" and a TLV value of transparent clock ID TC1 and interface P2 (e.g., indicating that the last hop in the path should be the router corresponding to the transparent clock identifier TC1, such as router 110, and that the packet should be transmitted from that router via interface P2). While not shown, there may be one or more other TLV data structures between these two indicating other intermediate hops along the path.

Each hop along the path may receive delay request message 230, locate its own transparent clock identifier in delay request message 230, and transmit delay request message 230 via the interface associated with the located transparent clock identifier in delay request message 230 to a next hop indicated in delay request message 230. For example, when router 110 receives delay request message 230, it may locate its transparent clock identifier (TC1) in a TLV data structure in delay request message 230, and may transmit delay request message 230 via the interface indicated in that identified TLV data structure (in this case, interface P2) to the next hop indicated in delay request message (which, in this case, is time transmitter 102 because there are no additional TLV data structures in delay request message 230 after the TLV data structure indicating TC1). Thus, the path information in delay request message 230 ensures that delay request message 230 is routed via the same path by which synchronization message 210 was routed from time transmitter 102 to time receiver 130.

After receiving delay request message 230, time transmitter 102 may (in the case of two-step operations or, optionally, in the case of one-step operation) copy the path information from delay request message 230 (e.g., in reverse) into a delay response message 240. Time transmitter 102 may add the desired path information in a reverse order from the order in which the path information appeared in delay request message 230. For example, the last hop in the path information in delay request message 230 may become the first hop in the path information that is added to the delay response message 240. In the depicted example, time transmitter 102 adds a series of TLV data structures to delay response message 240, beginning with a TLV data structure indicating a TLV type of "desired transparent clock path" and a TLV value of transparent clock ID TC1 and interface P2 (e.g., indicating that the first hop in the path should be the router corresponding to the transparent clock identifier TC1, such as router 110, and that the packet should be received by that router via interface P2) and ending with a TLV data structure indicating a TLV type of "desired transparent clock path" and a TLV value of transparent clock ID TC4 and interface P1 (e.g., indicating that the last hop in the path should be the router corresponding to the transparent clock identifier TC4, such as router 122, and that the packet should be received by that router via interface P1). While not shown, there may be one or more other TLV data structures between these two indicating other intermediate hops along the path.

Each hop along the path may receive delay response message 240, locate its own transparent clock identifier in delay response message 240, confirm that it received delay response message 240 via the interface associated with the located transparent clock identifier in delay response message 240, and transmit delay response message 240 to a next hop (e.g., according to that router's intrinsic routing policies). For example, when router 110 receives delay response message 240, it may locate its transparent clock identifier (TC1) in a TLV data structure in delay response message 240, may confirm that it received delay response message 240 via the interface associated with the located transparent clock identifier in delay response message 240 (in this case, interface P2), and may transmit delay response message 240 to the next hop (which, in this case, may be router 114, such as forwarding the message to router 112 according to the routing policies of router 110). Thus, the path information in delay response message 240 ensures that delay response message 240 is routed via the same path by which delay request message 230 was routed from time receiver 130 to time transmitter 102. Accordingly, time receiver 130 may be enabled to accurately determine an amount of delay between itself and time transmitter 102 using PTP techniques.

It is noted that the reason the path information may be included in delay response message 240 (e.g., in the form of TLV data structures) is to enable each router along the path to ensure that the delay response message 240 is received by that router on the same interface where the associated delay request message 230 was transmitted by that router. This is crucial in two-step clock operations, because in the two-step case, the transparent clock at each router may update the residence time of delay request message 230 to the correction field of the associated delay response message 240. In the case of one-step operation, including the path information in delay response message 240 (e.g., in the form of TLV data structures) is optional.

It is noted that particular implementation details, such as using TLV data structures, are included as examples, and techniques described herein may be implemented in other ways without departing from the scope of the present disclosure. For example, path information may be recorded in a packet in a different manner, such as using a different type of data structure or technique.

Techniques described herein are generally applicable to a network topology where multiple routes between a PTP time transmitter 102 and a PTP time receiver 130 exist. The PTP time transmitter 102 and PTP time receiver 130 may each be a single ordinary clock, or may be served by a boundary clock simultaneously. All of the routers in the path (e.g., routers 110, 114, 116, 118, 120, and/or 130 of FIG. 1) may be PTP aware, such as supporting end to end transparent clocks, and being configured to append path info in PTP synchronization messages originating from a time transmitter.

The time receiver 130 generally has a path determination and selection function, and can identify the communication path based on path information added by transparent clocks between time transmitter 102 and time receiver 130. Furthermore, the time receiver 130 may specify the backwards path for the delay request message to ensure the backward delay request message is transmitted via the same path as the corresponding synchronization message.

The time receiver 130 may further include a path selection function to determine the system time clock from one of the particular communication paths between time transmitter 102 and time receiver 130 (e.g., using techniques described below with respect to FIG. 3).

For example, with a one step clock implementation, a transparent clock (e.g., at router 110) may insert an identification of its transparent clock identifier and ingress interface to the PTP synchronization messages (e.g., synchronization message 210) that traverse through that transparent clock. With a two step clock implementation, a transparent clock (e.g., at router 110) may insert an identification of its transparent clock identifier and ingress interface of an associated synchronization message (e.g., synchronization message 210) into a follow up message to that synchronization message that is subsequently sent by time transmitter 102.

For a delay request message (e.g., delay request message 230), a transparent clock (e.g., at router 110) may look for its own transparent clock identifier in the extended TLV of the message, and may obtain the desired egress port of this message from that TLV. In some cases, the transparent clock may look into a local routing table and, if the desired egress port is one of the interfaces of the next hop, may forward the delay request message to this route. Otherwise, the transparent clock may add another TLV "Transparent clock reverse tracing fail" to the delay request message, and the packet may be forwarded according to the routing policies.

In some aspects, time transmitter 102 copies (e.g., in reverse order) the path info from the delay request message message to the end of delay response message.

On transmission of the delay request message, the time receiver 130 may fill the transparent clock information of the preferred path into a TLV extension of the delay request message. If a preferred path is not yet determined (e.g., using techniques described below with respect to FIG. 3), then the path of the last received synchronization message may be filled into a TLV extension of the delay request message.

Figure 3:
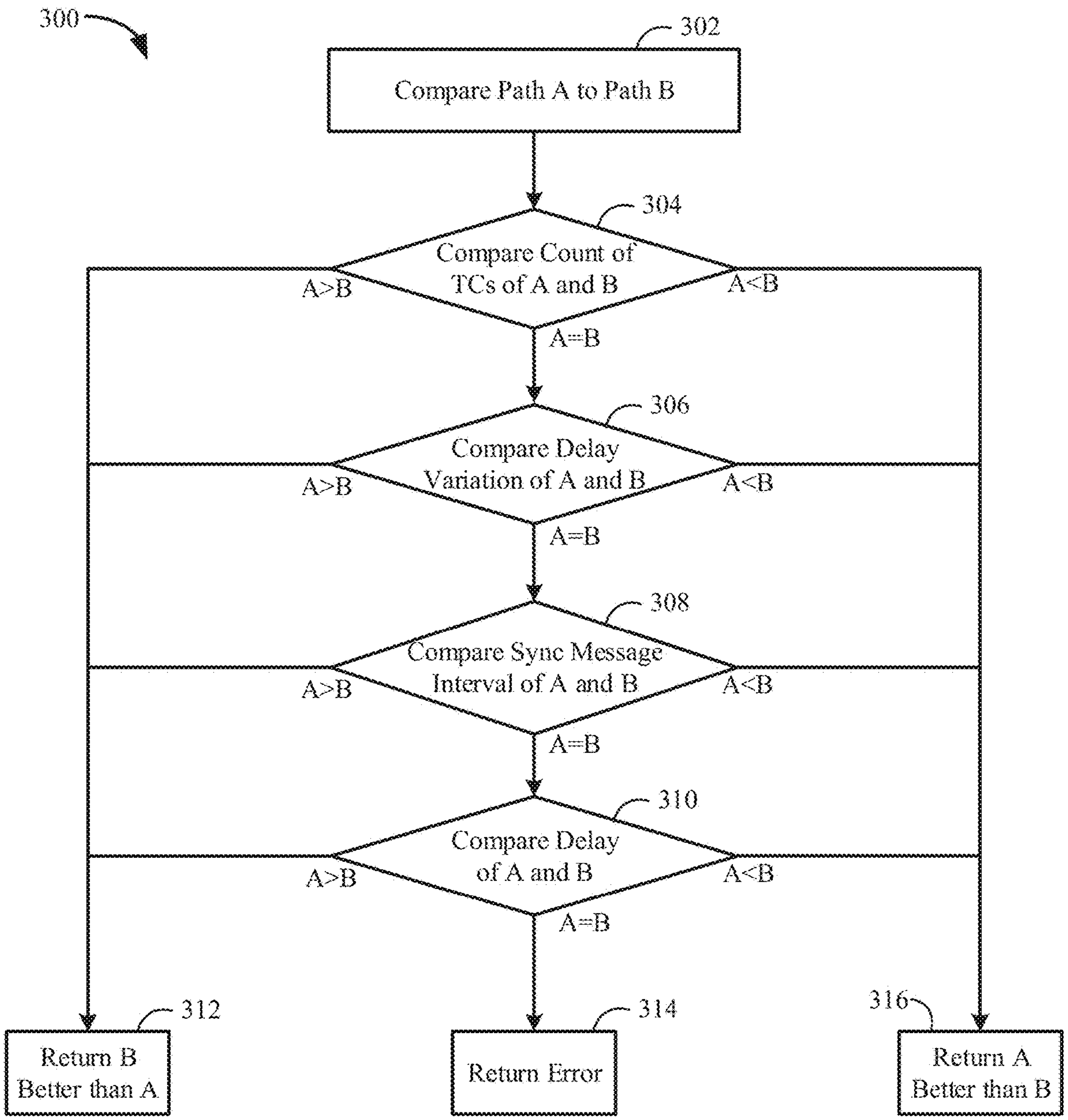
FIG. 3 is an illustration of path selection logic related to precision time protocol clock synchronization, according to certain embodiments.

FIG. 3 is an illustration 300 of path selection logic related to precision time protocol clock synchronization, according to certain embodiments. Illustration 300 may, for example, represent logic utilized by time receiver 130 of FIGS. 1 and 2 to select between multiple paths by which different synchronization messages were routed to time receiver 130 from time transmitter 102 of FIGS. 1 and 2. For example, time receiver 130 may determine two paths A and B from path information recorded in two different synchronization messages, and may use the logic shown in illustration 300 to select between paths A and B for a desired path to include in a delay request message.

At block 302, time receiver 130 of FIGS. 1 and 2 compares paths A and B. For example, block 302 may represent logic that includes comparisons 304, 306, 308, and 310.

At comparison 304, the counts of transparent clocks in paths A and B are compared. For example, the total number of transparent clocks (e.g., hops) in path A may be compared to the total number of transparent clocks (e.g., hops) in path B. If the count of transparent clocks in path A is greater than the count of transparent clocks in path B, then the operations may proceed to block 312, where a result is returned indicating that path B is better than path A. If the count of transparent clocks in path A is less than the count of transparent clocks in path B, then the operations may proceed to block 316, where a result is returned indicating that path A is better than path B. If the count of transparent clocks in path A is equal to the count of transparent clocks in path B, then the operations may proceed to comparison 306.

At comparison 306, the delay variations of path A and path B are compared. For example, the amount of delay variation in path A may be compared to the amount of delay variation in path B (e.g., where delay variation may refer to an amount of variation in delay between different packets transmitted by a given path, such as based on multiple packets that were transmitted via the given path and that are associated with delay information). If the delay variation for path A is greater than the delay variation for path B, then the operations may proceed to block 312, where a result is returned indicating that path B is better than path A. If the delay variation for path A is less than the delay variation for path B, then the operations may proceed to block 316, where a result is returned indicating that path A is better than path B. If the delay variation for path A is equal to the delay variation for path B, then the operations may proceed to comparison 308.

At comparison 308, the synchronization message intervals of path A and path B are compared. For example, the interval between synchronization messages routed via path A may be compared to the interval between synchronization messages routed via path B (e.g., where a larger synchronization message interval for a path may be indicative of congestion on that path or may be indicative of having less information about that path). If the synchronization message interval for path A is greater than the synchronization message interval for path B, then the operations may proceed to block 312, where a result is returned indicating that path B is better than path A. If the synchronization message interval for path A is less than the synchronization message interval for path B, then the operations may proceed to block 316, where a result is returned indicating that path A is better than path B. If the synchronization message interval for path A is equal to the synchronization message interval for path B, then the operations may proceed to comparison 310.

At comparison 310, the delays of path A and path B are compared. For example, the amount of delay between sending and receiving synchronization messages routed via path A may be compared to the amount of delay between sending and receiving synchronization messages routed via path B. If the delay for path A is greater than the delay for path B, then the operations may proceed to block 312, where a result is returned indicating that path B is better than path A. If the delay for path A is less than the delay for path B, then the operations may proceed to block 316, where a result is returned indicating that path A is better than path B. If the delay for path A is equal to the delay for path B, then the operations may proceed to block 314, where an error is returned. Alternatively, instead of returning an error, a random selection between path A and path B may be made, or a selection based on a relatively arbitrary factor (e.g., based on which path was used for the most recent synchronization message), and/or the like.

If a result is returned indicating that path B is better than path A, then path B may be selected and used to add desired path information to a delay request message. If a result is returned indicating that path A is better than path B, then path A may be selected and used to add desired path information to a delay request message.

For example, in case timing messages on a currently chosen path are interrupted or degraded, the time receiver could select an alternative path from a timing path list that it maintains. Since the time receiver knows the propagation delay of each path, the delay difference can be compensated and the phase jump will be minimal, and lock after path switching will be quick.

Figure 4:
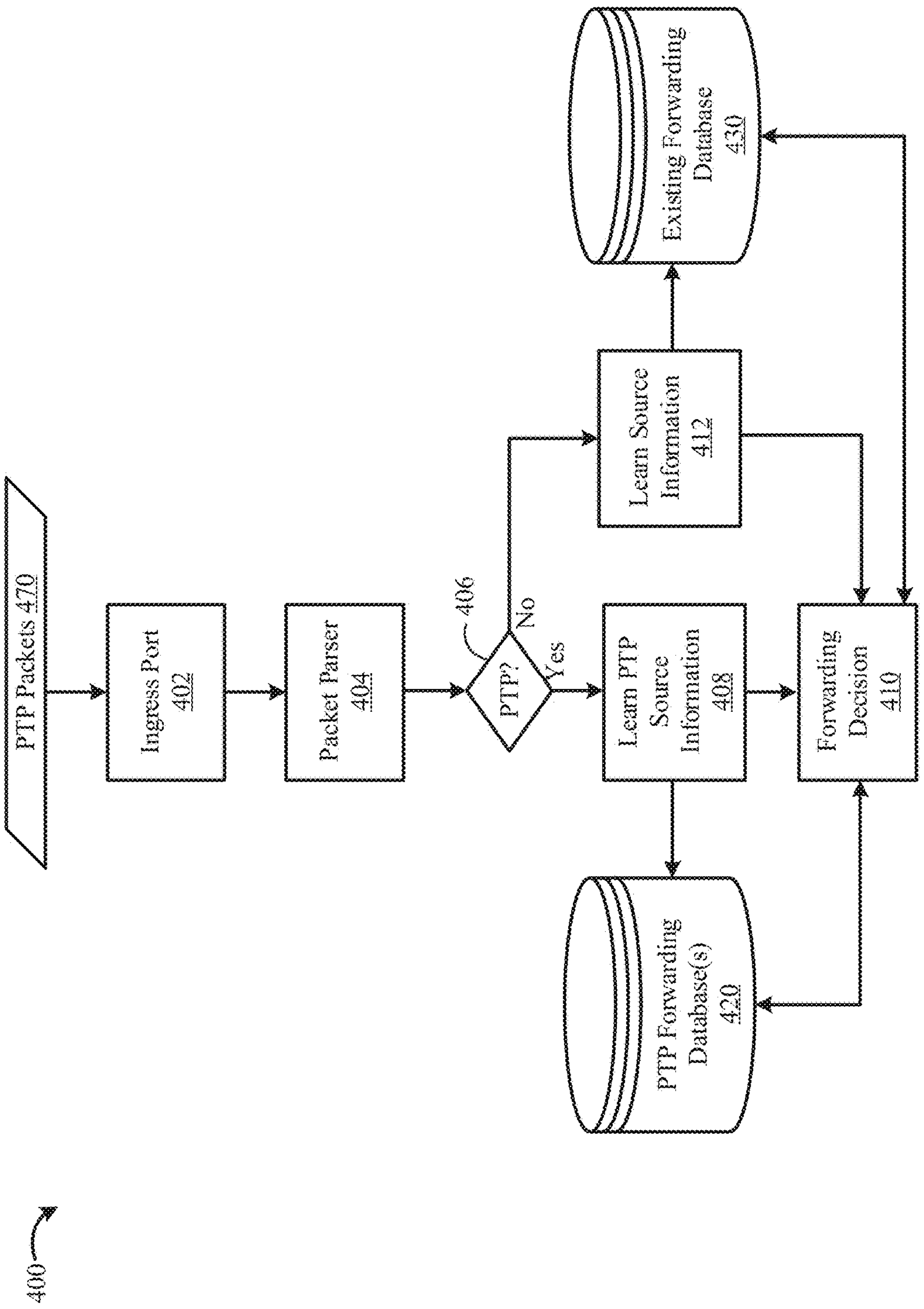
FIG. 4 is an illustration of an example related to link aggregation group link selection between adjacent network elements, according to certain embodiments.

FIG. 4 is an illustration 400 of an example related to link aggregation group link selection between adjacent network elements, according to certain embodiments. Illustration 400 may, for example, represent logic by which path information (e.g., including a link aggregation group interface) may be learned by network elements (e.g., routers) to ensure symmetrical routing of bidirectional PTP traffic. For instance, such logic may be implemented by a router such as router 110 of FIG. 1.

PTP packets 470 are received via an ingress port 402, and parsed at a packet parser 404. The ingress port 402 may, for example, be a member of a link aggregation group (LAG), and may be referred to as a LAG interface or link (or may be another type of port). If ingress port 402 is a member of a LAG, then the LAG port may be passed on to further stages in the logic.

Packet parser 404 may parse each received packet to determine if it is a PTP packet (and, in some embodiments, to extract other information from the packet). At decision 406, a determination is made of whether a given packet is a PTP packet. If a given packet is determined not to be a PTP packet at decision 406, then the source information for the given packet may be learned at block 412 and stored in an existing forwarding database 430. However, if a given packet is determined to be a PTP packet at decision 406, then the PTP source information of the given packet may be learned at block 408 and stored in one or more PTP forwarding databases 420. A forwarding decision 410 may then be made for each packet based on either PTP forwarding database(s) 420 or existing forwarding database 430, and the packet may be forwarded accordingly.

For example, PTP forwarding database(s) 420 may include different forwarding databases for different PTP encapsulations (e.g., bridging, IP routing, MPLS switching, etc.), such as a first forwarding database 420 for storing path information related to transmission of PTP packets over Ethernet and a second forwarding database 420 for storing path information related to transmission of PTP packets with internet protocol (IP) headers, such as over a broader network. In another example, forwarding database(s) 420 may include a first forwarding database 420 for storing path information related to transmission of unicast PTP packets and a second forwarding database 420 for storing path information related to transmission of multicast PTP packets. In yet another example, forwarding database(s) 420 may include a first forwarding database 420 for storing path information related to transmission of unicast PTP packets over multiprotocol label switching (MPLS) and a second forwarding database 420 for storing path information related to transmission of unicast PTP packets over IP. Existing forwarding database 430 may represent a forwarding database that stores path information related to non-PTP packets. The path information learned at block 408 and stored in one or more PTP forwarding databases 420 may include, for example, a MAC address, a VLAN, an interface (e.g., ingress port 402), a LAG (e.g., a LAG interface or link), and/or the like (e.g., from which and/or by which the network element received the packet). Similar path information may be learned at block 412 and stored in existing forwarding database 430 for non-PTP packets. In some embodiments, such as when a bridge interface is present, a bridge configuration database may also be used at blocks 408 and 412 for learning of source information. For example, a bridge configuration database may store bridge domain information such as VLAN, LAG, and port information.

For example, for a LAG with multiple active links between two adjacent network nodes, in existing techniques a hash mode with the MAC, Ethernet type, VLAN, IP, etc of the packet will generally be used to select a LAG link as the final transport port. Due to the hash mode selection and different implementations on both network nodes there is no guarantee that bidirectional PTP packets will be transmitted via the same member link in both directions. For example, PTP packets transmitted via link 1 from node A to node B may be transmitted via link n from node B to node A in existing techniques. This may cause asymmetry, eventually causing loss of lock or performance degradation for PTP timing. Techniques described herein solve this problem, and are applicable to PTP over Ethernet, PTP over IP over user datagram protocol (UDP), and PTP over IP over UDP over MPLS, for boundary clock (BC), transparent clock (TC), and ordinary clock (OC) roles.

For instance, for a bridging node, certain techniques involve learning a destination multicast MAC, VLAN and LAG interface and its lag link when PTP packets enter a network node via a LAG interface for PTP over Ethernet encapsulation, and such learned information may be stored in a PTP forwarding database 420. In an example, some techniques involve learning the source MAC, VLAN and LAG interface and its lag link when PTP packets enter a network node via a LAG interface for PTP over IP over UDP or for PTP over IP over UDP over MPLS encapsulation, and such learned information may be stored in a PTP forwarding database 420.

In some aspects, unknown unicast forwarding for PTP will follow existing network forwarding method, since a PTP forwarding database 420 will not be hit. Known unicast forwarding for PTP mat be handled by querying a PTP forwarding database 420 and determining the specific LAG link that was learned previously for transport. In some cases, multicast forwarding for PTP will follow existing multicast forwarding methods such that for each multicast group member, if a copy of the multicast group member is a LAG then a PTP forwarding database 420 for multicast will be queries and, if there is a hit, the LAG link will be resolved for forwarding, while otherwise a random LAG link based on hash may be resolved for forwarding.

In some cases, an aging/refresh mechanism may be utilized. For example, if there is a link failure, the corresponding entry in one or more forwarding databases (e.g., one or more of forwarding database(s) 420) may be flushed out. If one or more PTP packets enter a bridge/routing/MPLS node via a different link than the link that was previously learned (e.g., for the same source MAC, VLAN, and/or IP address), then the learned entry may be updated in a corresponding forwarding database to refer to the different link. In some aspects, aging may involve removing an entry from a forwarding database after a timeout period has expired (e.g., without a packet being received via a given link corresponding to the entry).

In certain embodiments, a PTP forwarding database 420 for PTP over UDP over IP can be combined with existing forwarding database 430. In some embodiments, multicast and unknown unicast forwarding may generally follow existing multicast forwarding behavior while unicast packets with known destinations may be forwarded according to one or more forwarding databases as described herein. When using a PTP forwarding database 420, a LAG member may be resolved based on destination MAC, VLAN, and LAG link.

Similar learning and forwarding techniques to those described above may also be utilized in a layer 2 (L2) networking context, with a combination of MAC and VLAN being used for routing nodes. However, certain techniques described herein may use L3 networking with IP.

For example, the source IP address and LAG of PTP packets may be learned as described herein upon receiving PTP packets, while current routing systems do not have this capability. When forwarding PTP packets over a LAG interface, a learned PTP forwarding database 420 may be queried and, if there is a hit, a LAG member link may be resolved. If there is no hit, PTP packets may be forwarded based on a hash mechanism. Similar aging/refresh logic to that described above may be used in such embodiments. For example, if there is a link failure, the corresponding entry in one or more forwarding databases (e.g., one or more of forwarding database(s) 420) may be flushed out. If one or more PTP packets enter a node via a different link than the link that was previously learned (e.g., for the same source MAC, VLAN, and/or IP address), then the learned entry may be updated in a corresponding forwarding database to refer to the different link. In some aspects, aging may involve removing an entry from a forwarding database after a timeout period has expired (e.g., without a packet being received via a given link corresponding to the entry).

Figure 5:
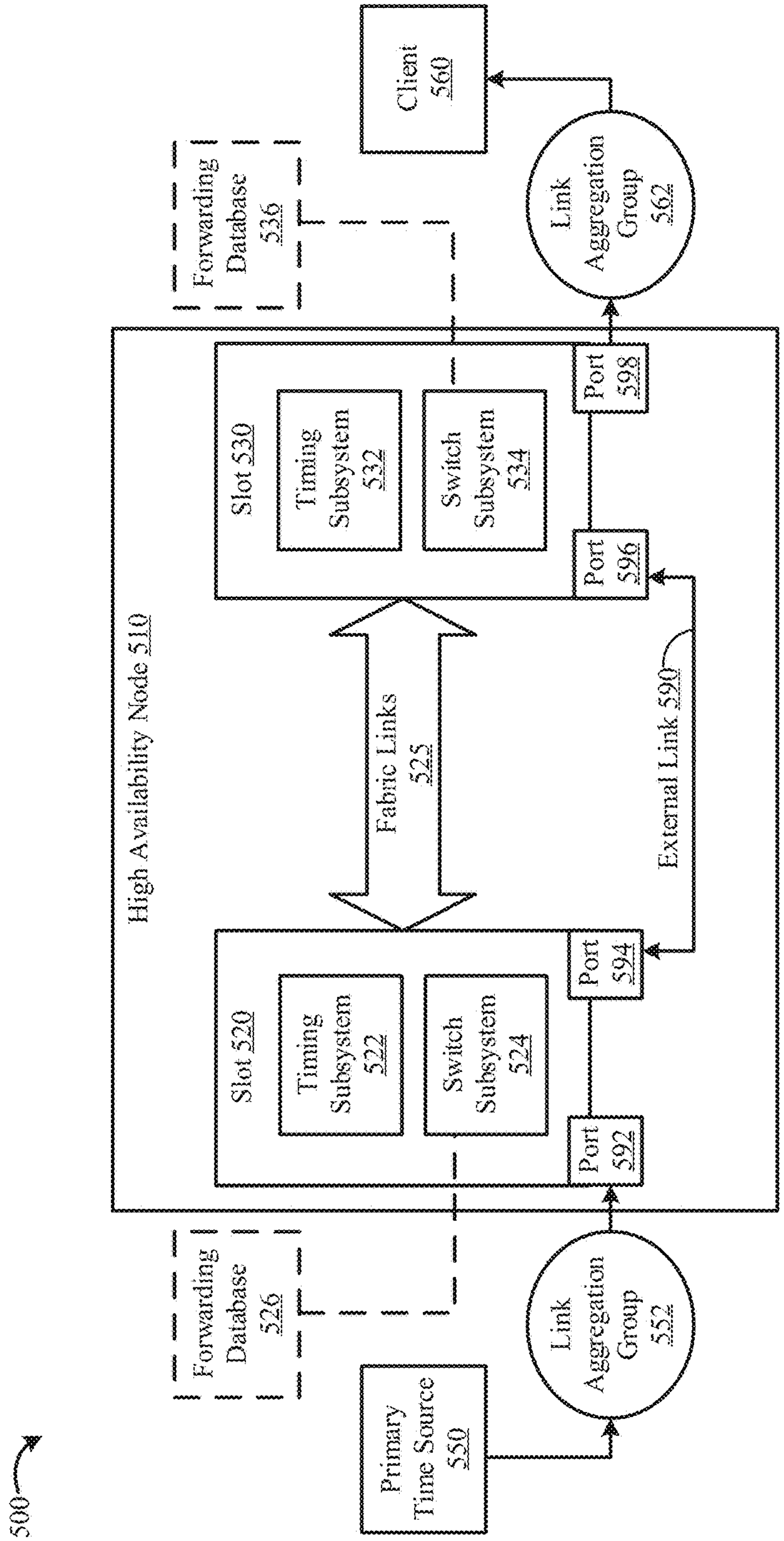
FIG. 5 is an illustration of an example related to high availability of time accuracy network nodes, according to certain embodiments.

FIG. 5 is an illustration 500 of an example related to high availability of time accuracy network nodes, according to certain embodiments.

A high availability node 510 is designed to provide fault tolerant time transmission service to clients. For example, high availability node 510 may correspond to time transmitter 102 of FIG. 1, or may correspond to a different component, such as a different router or other network element capable of providing timing information to a client node (e.g., time receiver 130 of FIG. 1 or a different node). A primary time source 550 (which may also be referred to a root timing reference or "grandmaster") may comprise a clock that all other clocks synchronize to (e.g., the top-level clock in the hierarchy). Primary time source 550 is connected to high availability node 510 via a link aggregation group (LAG) 552, which includes a particular port 592 of high availability node 510. A client 560 generally represents a node that receives timing information from high availability node 510, which may itself receive timing information from primary time source 550. For example, client 560 may correspond to time receiver 130 of FIG. 1 or a different node. Client 560 is connected to high availability node 510 via a LAG 562, of which a port 598 of high availability node 510 is a member.

High availability node 510 includes two slots 520 and 530, each of which includes a timing subsystem 522 or 532 and a switch subsystem 524 or 534. For example, slot 520 may include a first network interface card (NIC) comprising timing subsystem 552 and switch subsystem 524 and slot 530 may include a second NIC comprising timing subsystem 532 and switch subsystem 534. Slots 520 and 530 are connected via one or more fabric links 525 and are also connected by an external link 590 (e.g., via ports 594 and 596). For example slot 520 may comprise ports 592 and 594, while slot 530 may comprise ports 596 and 598.

According to certain embodiments, timing subsystems 522 and 532 may negotiate with one another to determine which will be the primary timing subsystem and which will be the secondary (e.g., failover) timing subsystem.

In conventional techniques there is no high availability consideration on timing network nodes, and if a node fails it will not be able to distribute timing to its clients. Techniques described herein provide a solution for high availability inside a timing accuracy network node. According to certain embodiments, two cards are used in a high availability node, and each card has its own timing subsystem 522 or 532 which is running a boundary clock function independently. The timing subsystem 522 and 532 on each card can communicate with primary timing source 550 via both a local port and a port on the mate card. From the perspective of primary timing source 550, it will see two clients within this singly high availability node 510.

As a PTP server, the timing subsystem 522 or 532 on each card may interact with PTP clients (e.g., client 560) connected to both the local and mate card. The timing subsystems 522 and 532 on the two cards can communicate with each other, and will decide a best primary timing subsystem (e.g., using a best master clock algorithm or BMCA) to provide timing to downlink customer premise equipment (CPE) such as client 560, and the other timing subsystem will enter a secondary state, and will not advertise announce messages.

In case of one card failure (e.g., if the card in one of slots 520 or 530 fails), the high availability node 510 may switch over to the other card (e.g., the card in the other of slots 520 or 530) and continue to distribute timing to subordinate PTP clients such as client 560. Techniques described herein can be extended to multiple (e.g., more than two) slots (cards) with one slot (card) acting as the primary or master role and the rest of the slots (cards) acting as the secondary roles.

If fabric links 525 between the two cards support time synchronization, PTP packets between the two slots 520 and 530 may be transferred via fabric links 525, and the clocks in two cards can be synchronized with one another. Otherwise, the clocks may not be synchronized between the two cards, which may cause a time accuracy issue on PTP packet transfer between the two cards. Thus, techniques described herein may utilize external ports on the processing units, such as ports 594 and 596, to transfer PTP packets (e.g., via external link 590) between the two cards. Thus, aspects of the present disclosure may ensure that the packets are transmitted through these external ports instead of the fabric links 525. The two processing units may perform timestamping and transparent clock (TC) updating locally.

Primary timing source 550 may be connected to this high availability node 510 with a cross-card LAG interface, so that if there is a failure of one card, primary timing source 550 may switch to another card and the timing subsystem on that other card will continue to distribute timing to subordinate PTP clients such as client 560.

A packet forwarding path from primary timing source 550 to both timing subsystems 522 and 523 may be performed as follows. For normal (e.g., non-PTP) traffic, the MAC may be learned on a bridge domain of both cards, and traffic may be forwarded through the internal fabric links 525 between the two processing units, which will not have timestamping. However, MAC learning on a bridge domain for PTP traffic may be performed differently according to techniques described herein. For PTP traffic, the MAC may only be learned on a local bridge domain of a given card. For example, unicast PTP packets may only be forwarded to local members in the bridge domain by querying a bridge forwarding database table (e.g., forwarding database 526 or 536).

For instance, certain techniques may involve only adding members on local devices to a flood group for the bridge domain used for PTP traffic. Thus, PTP multicast packets may only be forwarded to local ports instead of fabric links 525.

In an example, slot 520 may receive a PTP packet from primary timing source 550. Primary timing source 550 may have chosen one of the links in the LAG interface for LAG 552, such as port 592, by which to transmit the PTP packet to slot 520. Port 592 may update the transparent clock at the MAC or physical layer. In a given bridge domain of switch subsystem 524 (e.g., bridge domain A), a bridge table (e.g., forwarding database 526) may be queried to obtain a destination and MAC learned on port 592 in this bridge domain (e.g., learned in a manner such as that described above with respect to FIG. 4). If the destination is not found or the packet is not a unicast packet, the PTP packet may be replicated to the members in the flood group (e.g., which may include port 594 and, in some aspects, a port that connects the bridge domain and timing subsystem 522). If the destination is the port that connects the bridge domain and timing subsystem 522, the PTP packet may be sent out from that port, such as with a timestamp performed at the MAC or physical layer. If the destination is port 594, the PTP packet may be sent out from port 594, such as with a timestamp from the MAC or physical layer.

If slot 530 receives a PTP unicast packet at port 596, it may update the transparent clock at the MAC or physical layer. In a given bridge domain of switch subsystem 534 (e.g., bridge domain A), a bridge table (e.g., forwarding database 536) may be queried to obtain a destination and MAC learned on port 596 in this bridge domain (e.g., learned in a manner such as that described above with respect to FIG. 4). If the destination is not found or the packet is not a unicast packet, the PTP packet may be replicated to the members in the flood group (e.g., which may include a port that connects the bridge domain and timing subsystem 532). If the destination is the port that connects the bridge domain and timing subsystem 532, the PTP unicast packet may be sent out from the port that connects the bridge domain and timing subsystem 532, such as with a timestamp from the MAC or physical layer.

Client 560 may connect to this high availability node 510 with a cross-card LAG interface, so that if there is a failure of one card, client 560 may switch to another card and the timing subsystem on that card may switch to a primary or master role and continue to distribute timing to subordinate clients. A packet forwarding path from client 560 to the master timing subsystem (e.g., one of timing subsystems 522 or 532) may be performed as follows.

In an example, a PTP packet is received at slot 530 from client 560, such as via a link in LAG 562 (e.g., client 560 may have chosen port 598 from the links in the LAG interface). Port 598 may update the transparent clock at the MAC or physical layer. In a given bridge domain of switch subsystem 534 (e.g., bridge domain A), a bridge table (e.g., forwarding database 536) may be queried to obtain a destination and MAC learned on port 598 in this bridge domain (e.g., learned in a manner such as that described above with respect to FIG. 4). If the destination is not found or the packet is not a unicast packet, the PTP packet may be replicated to the members in the flood group (e.g., which may include port 596 and a port that connects the bridge domain and timing subsystem 532). If the destination is port 596, the PTP packet may be sent out from port 596, such as with a timestamp from the MAC or physical layer.

If slot 520 receives a PTP unicast packet at port 594, it may update the transparent clock at the MAC or physical layer. In a given bridge domain of switch subsystem 524 (e.g., bridge domain A), a bridge table (e.g., forwarding database 526) may be queried to obtain a destination and MAC learned on port 594 in this bridge domain (e.g., learned in a manner such as that described above with respect to FIG. 4). If the destination is not found or the packet is not a unicast packet, the PTP packet may be replicated to the members in the flood group (e.g., which may include a port that connects the bridge domain and timing subsystem 522). If the destination is the port that connects the bridge domain and timing subsystem 522, the PTP unicast packet may be sent out from the port that connects the bridge domain and timing subsystem 522, such as with a timestamp from the MAC or physical layer.

Figure 6:
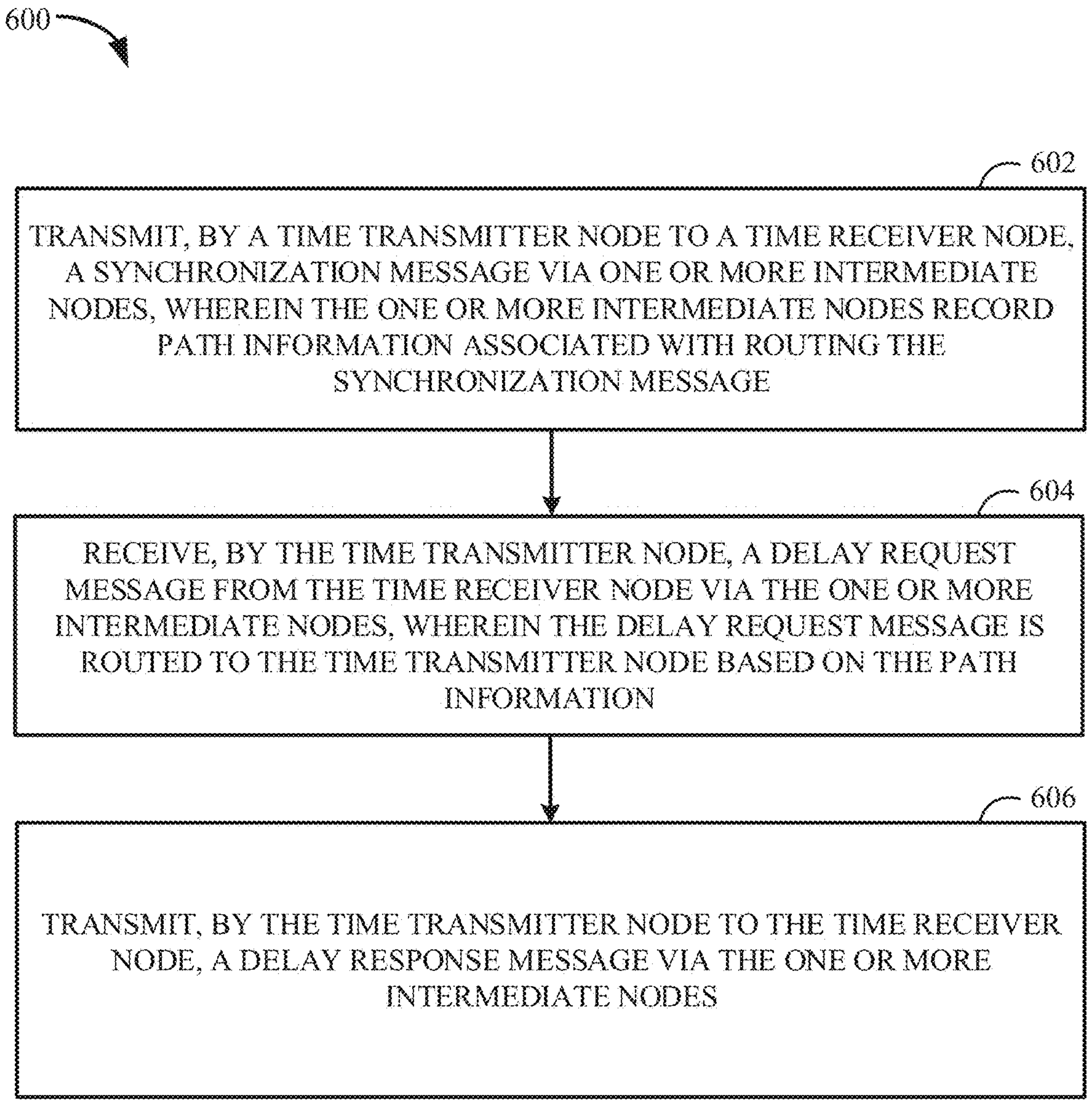
FIG. 6 is a flow chart depicting example operations related to precision time protocol clock synchronization, according to certain embodiments.

FIG. 6 is a flow chart depicting example operations 600 related to precision time protocol clock synchronization, according to certain embodiments. For example, operations 600 may be performed by one or more components described above with respect to FIGS. 1-5. In one embodiment, operations 600 are performed by time transmitter 102, time receiver 130, and/or one or more of routers 110, 114, 116, 118, 120, and/or 122 of FIG. 1.

Operations 600 begin at step 602, with transmitting, by a time transmitter node to a time receiver node, a synchronization message via one or more intermediate nodes, wherein the one or more intermediate nodes record path information associated with routing the synchronization message.

Operations 600 continue at step 604, with receiving, by the time transmitter node, a delay request message from the time receiver node via the one or more intermediate nodes, wherein the delay request message is routed to the time transmitter node based on the path information. It is noted that the synchronization message initiated by the time transmitter and the delay request message initiated by the time receiver may be independent of one another (e.g., the delay request message is not a response to the synchronization message). For example, the time receiver may transmit delay request messages at a configured delay request interval, and the delay request interval can differ from a synchronization message interval at which the time transmitter transmits synchronization messages.

Operations 600 continue at step 606, with transmitting, by the time transmitter node to the time receiver node, a delay response message via the one or more intermediate nodes, wherein the delay response messages is routed to the time receiver node based on the path information.

Some embodiments further comprise a time receiver node configured to: receive the synchronization message from the time transmitter node via the one or more intermediate nodes; transmit, to the time transmitter node, the delay request message via the one or more intermediate nodes; receive the delay response message from the time transmitter node via the one or more intermediate nodes; and compute a delay between the time transmitter node and the time receiver node based on timestamps associated with the delay request message and the delay response message.

In some embodiments, the one or more intermediate nodes recording the path information comprises inserting into the synchronization message, by a respective transparent clock associated with each respective intermediate node of the one or more intermediate nodes, an identifier of the respective transparent clock and an ingress interface by which the respective intermediate node received the synchronization message.

In certain embodiments, the delay request message being routed to the time transmitter node based on the path information comprises selecting, by each respective intermediate node of the one or more intermediate nodes, an egress interface by which to send the delay request message based on identifying the ingress interface associated in the path information with the identifier of the respective transparent clock associated with the respective intermediate node.

In some embodiments, a respective intermediate node of the one or more intermediate nodes: determines that the ingress interface associated in the path information with the identifier of the respective transparent clock associated with the respective intermediate node is not available; adds a reverse tracing failure indication to the delay request message; and selects a different interface as the egress interface based on one or more routing policies.

In certain embodiments, one or more intermediate nodes record the path information in the synchronization message, and the time receiver node may be configured to copy the path information from the synchronization message into the delay request message, and wherein the time transmitter node is configured to copy the path information from the delay request message into the delay response message.

In some embodiments, the time receiver node is further configured to: receive an additional synchronization message from the time transmitter node via one or more different intermediate nodes, wherein the one or more different intermediate nodes record different path information in the additional synchronization message; and determine that the path information in the synchronization message represents a preferred path as compared to the different path information in the additional synchronization message based on one or more path selection factors, wherein the copying of the path information from the synchronization message into the delay request message is based on the determining that the path information in the synchronization message represents the preferred path.

In certain embodiments, the one or more path selection factors comprise one or more of: counts of transparent clocks identified in the path information and the different path information; delays associated with the path information and the different path information; or synchronization message intervals associated with the path information and the different path information.

In some embodiments, the time receiver node is further configured to: determine a degradation or interruption associated with the preferred path; and select an alternative preferred path based on the one or more path selection factors. In certain embodiments, the one or more intermediate nodes recording the path information comprises storing, by each respective intermediate node of the one or more intermediate nodes, in a forwarding database associated with the respective intermediate node, a media access control (MAC) address, a virtual local area network (VLAN) identifier, and a link aggregation group (LAG) interface by which the respective intermediate node received the synchronization message, wherein each respective intermediate node of the one or more intermediate nodes uses the forwarding database associated with the respective intermediate node to route the delay request message.

In certain embodiments, a respective intermediate node is configured to: determine a degradation or interruption associated with an entry in the forwarding database; and remove the entry from the forwarding database.

In some embodiments, the one or more intermediate nodes recording the path information comprises storing, by each respective intermediate node of the one or more intermediate nodes, in a forwarding database associated with the respective intermediate node, a media access control (MAC) address and a virtual local area network (VLAN) identifier by which the respective intermediate node received the synchronization message, wherein each respective intermediate node of the one or more intermediate nodes uses the forwarding database associated with the respective intermediate node to route the delay request message.

In certain embodiments, the one or more intermediate nodes recording the path information comprises storing, by each respective intermediate node of the one or more intermediate nodes, in a forwarding database associated with the respective intermediate node, an internet protocol (IP) address and a link aggregation group (LAG) interface by which the respective intermediate node received the synchronization message, wherein each respective intermediate node of the one or more intermediate nodes uses the forwarding database associated with the respective intermediate node to route the delay request message.

In some embodiments, a given intermediate node of the one or more intermediate nodes comprises a first network interface card and a second network interface card connected via fabric links, and the first network interface card and the second network interface card are configured to transmit PTP packets via an external port rather than via the fabric links.

In certain embodiments, the first network interface card comprises a primary timing subsystem and the second network interface card comprises a secondary timing subsystem, and the second network interface card is used to distribute timing information to one or more clients in the event of a failure of the first network interface card.

Each node, element, and/or device in the network(s) described herein may comprise and/or may be implemented via one or more computing devices capable of executing software code to perform the processing steps described herein. Such a device may include a processor, memory, interfaces, high-speed expansion ports, and interconnected buses. The processor can process instructions for execution within the computing device, including instructions stored in the memory or on a storage device to display graphical information for a (graphical user interface) GUI on an external input/output (I/O) device, such as a display coupled to high speed interface. In other implementations, multiple processors and/or multiple busses may be used, as appropriate, along with multiple memories and types of memory.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. In an embodiment, an ASIC design can be used to implement system algorithms as well as hardware accelerated designs for specific use cases.

These computer programs (also known as programs, software, software applications or code) can include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The present disclosure, in various embodiments, includes components, methods, processes, systems and/or apparatus substantially as depicted and described herein, including various embodiments, sub-combinations, and subsets thereof. Those of ordinary skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word:

any of the items in the list, all of the items in the list and any combination of the items in the list.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

We claim:

1. A system for precision time protocol (PTP) clock synchronization, comprising:

a time transmitter node configured to:

transmit, to a time receiver node, a synchronization message via one or more intermediate nodes, wherein the one or more intermediate nodes record path information associated with routing the synchronization message;

receive a delay request message from the time receiver node via the one or more intermediate nodes, wherein the delay request message is routed to the time transmitter node based on the path information; and transmit, to the time receiver node, a delay response message via the one or more intermediate nodes; and the time receiver node configured to:

receive the synchronization message from the time transmitter node via the one or more intermediate nodes;

transmit, to the time transmitter node, the delay request message via the one or more intermediate nodes;

receive the delay response message from the time transmitter node via the one or more intermediate nodes; and compute a delay between the time transmitter node and the time receiver node based on timestamps associated with the delay request message and the delay response message.

2. The system of claim 1, wherein the one or more intermediate nodes recording the path information comprises inserting into the synchronization message, by a respective transparent clock associated with each respective intermediate node of the one or more intermediate nodes, an identifier of the respective transparent clock and an ingress interface by which the respective intermediate node received the synchronization message.

3. The system of claim 2, wherein the delay request message being routed to the time transmitter node based on the path information comprises selecting, by each respective intermediate node of the one or more intermediate nodes, an egress interface by which to send the delay request message based on identifying the ingress interface associated in the path information with the identifier of the respective transparent clock associated with the respective intermediate node.

4. The system of claim 3, wherein a respective intermediate node of the one or more intermediate nodes:

determines that the ingress interface associated in the path information with the identifier of the respective transparent clock associated with the respective intermediate node is not available;

adds a reverse tracing failure indication to the delay request message; and selects a different interface as the egress interface based on one or more routing policies.

5. The system of claim 1, wherein the one or more intermediate nodes record the path information in the synchronization message, wherein the time receiver node is configured to copy the path information from the synchronization message into the delay request message, and wherein the time transmitter node is configured to copy the path information from the delay request message into the delay response message.

6. The system of claim 5, wherein the time receiver node is further configured to:

receive an additional synchronization message from the time transmitter node via one or more different intermediate nodes, wherein the one or more different intermediate nodes record different path information in the additional synchronization message; and determine that the path information in the synchronization message represents a preferred path as compared to the different path information in the additional synchronization message based on one or more path selection factors, wherein the copying of the path information from the synchronization message into the delay request message is based on the determining that the path information in the synchronization message represents the preferred path.

7. The system of claim 6, wherein the one or more path selection factors comprise one or more of:

counts of transparent clocks identified in the path information and the different path information;

delays associated with the path information and the different path information; or synchronization message intervals associated with the path information and the different path information.

8. The system of claim 6, wherein the time receiver node is further configured to:

determine a degradation or interruption associated with the preferred path; and select an alternative preferred path based on the one or more path selection factors.

9. The system of claim 1, wherein the one or more intermediate nodes recording the path information comprises storing, by each respective intermediate node of the one or more intermediate nodes, in a forwarding database associated with the respective intermediate node, a media access control (MAC) address, a virtual local area network (VLAN) identifier, and a link aggregation group (LAG) interface by which the respective intermediate node received the synchronization message, wherein each respective intermediate node of the one or more intermediate nodes uses the forwarding database associated with the respective intermediate node to route the delay request message.

10. The system of claim 9, wherein a respective intermediate node is configured to:

determine a degradation or interruption associated with an entry in the forwarding database; and remove the entry from the forwarding database.

11. The system of claim 1, wherein the one or more intermediate nodes recording the path information comprises storing, by each respective intermediate node of the one or more intermediate nodes, in a forwarding database associated with the respective intermediate node, a media access control (MAC) address and a virtual local area network (VLAN) identifier by which the respective intermediate node received the synchronization message, wherein each respective intermediate node of the one or more intermediate nodes uses the forwarding database associated with the respective intermediate node to route the delay request message.

12. The system of claim 1, wherein the one or more intermediate nodes recording the path information comprises storing, by each respective intermediate node of the one or more intermediate nodes, in a forwarding database associated with the respective intermediate node, an internet protocol (IP) address and a link aggregation group (LAG) interface by which the respective intermediate node received the synchronization message, wherein each respective intermediate node of the one or more intermediate nodes uses the forwarding database associated with the respective intermediate node to route the delay request message.

13. The system of claim 1, wherein a given intermediate node of the one or more intermediate nodes comprises a first network interface card and a second network interface card connected via fabric links, and wherein the first network interface card and the second network interface card are configured to transmit PTP packets via an external port rather than via the fabric links.

14. The system of claim 13, wherein the first network interface card comprises a primary timing subsystem and the second network interface card comprises a secondary timing subsystem, and wherein the second network interface card is used to distribute timing information to one or more clients in event of a failure of the first network interface card.

15. A method for precision time protocol (PTP) clock synchronization, comprising:

transmitting, by a time transmitter node to a time receiver node, a synchronization message via one or more intermediate nodes, wherein the one or more intermediate nodes record path information associated with routing the synchronization message;

receiving, by the time transmitter node, a delay request message from the time receiver node via the one or more intermediate nodes, wherein the delay request message is routed to the time transmitter node based on the path information; and transmitting, by the time transmitter node to the time receiver node, a delay response message via the one or more intermediate nodes.

16. The method of claim 15, wherein the one or more intermediate nodes recording the path information comprises inserting into the synchronization message, by a respective transparent clock associated with each respective intermediate node of the one or more intermediate nodes, an identifier of the respective transparent clock and an ingress interface by which the respective intermediate node received the synchronization message.

17. The method of claim 16, wherein the delay request message being routed to the time transmitter node based on the path information comprises selecting, by each respective intermediate node of the one or more intermediate nodes, an egress interface by which to send the delay request message based on identifying the ingress interface associated in the path information with the identifier of the respective transparent clock associated with the respective intermediate node.

18. The method of claim 17, wherein a respective intermediate node of the one or more intermediate nodes:

determines that the ingress interface associated in the path information with the identifier of the respective transparent clock associated with the respective intermediate node is not available;

adds a reverse tracing failure indication to the delay request message; and selects a different interface as the egress interface based on one or more routing policies.

19. The method of claim 15, wherein the one or more intermediate nodes record the path information in the synchronization message, wherein the time receiver node is configured to copy the path information from the synchronization message into the delay request message, and wherein the time transmitter node is configured to copy the path information from the delay request message into the delay response message.

20. A non-transitory computer-readable medium storing instructions that, when executed by one or more processors of a computing system, cause the computing system to:

transmitting, by a time transmitter node to a time receiver node, a synchronization message via one or more intermediate nodes, wherein the one or more intermediate nodes record path information associated with routing the synchronization message;

receiving, by the time transmitter node, a delay request message from the time receiver node via the one or more intermediate nodes, wherein the delay request message is routed to the time transmitter node based on the path information; and transmitting, by the time transmitter node to the time receiver node, a delay response message via the one or more intermediate nodes.

* * * * *